United States Patent
Plantan

Patent Number: 5,507,217
Date of Patent: Apr. 16, 1996

[54] PERFORATE DIAPHRAGM ALIGNMENT SYSTEM FOR SPRING BRAKE ACTUATORS

[75] Inventor: Ronald S. Plantan, Charlotte, N.C.

[73] Assignee: Indian Head Industries, Inc., Charlotte, N.C.

[21] Appl. No.: 316,513

[22] Filed: Sep. 30, 1994

[51] Int. Cl.$^6$ .............................. F01B 7/00; F01B 31/00
[52] U.S. Cl. .................... 92/63; 92/100; 92/130 A
[58] Field of Search .................... 92/63, 98 R, 99, 92/100, 130 A

[56] References Cited

U.S. PATENT DOCUMENTS

| | | | |
|---|---|---|---|
| H748 | 3/1990 | Graham | 92/130 A X |
| 1,885,457 | 11/1932 | Lord et al. | 92/99 |
| 2,080,391 | 5/1937 | Rockwell . | |
| 2,219,441 | 10/1940 | Carnes . | |
| 2,258,784 | 10/1941 | McNeal . | |
| 2,578,730 | 12/1951 | Nicholson et al. . | |
| 2,641,283 | 6/1953 | Houston . | |
| 2,661,767 | 12/1953 | Lamb . | |
| 2,675,758 | 4/1954 | Hughes . | |
| 2,713,850 | 7/1955 | Bradbury et al. | 92/100 |
| 2,744,543 | 5/1956 | Brady, Jr. . | |
| 2,886,011 | 5/1959 | Radford . | |
| 3,020,094 | 2/1962 | Murty et al. | 303/9 |
| 3,101,219 | 8/1963 | Herrera | 303/6 |
| 3,127,818 | 4/1964 | Cruse . | |
| 3,175,473 | 3/1965 | Boteler et al. | 92/130 A X |
| 3,244,079 | 4/1966 | Herrera | 92/63 |
| 3,334,545 | 8/1967 | Houser . | |
| 3,380,349 | 4/1968 | James . | |
| 3,416,461 | 12/1968 | McFarland . | |
| 3,424,064 | 1/1969 | Valentine . | |
| 3,548,720 | 12/1970 | Swander, Jr. . | |
| 3,581,627 | 6/1971 | Campanini | 92/63 |
| 3,599,760 | 8/1971 | Moss . | |
| 3,696,711 | 10/1972 | Berg | 92/63 X |
| 3,712,178 | 1/1973 | Hensley . | |
| 3,730,056 | 5/1973 | Swander, Jr. . | |
| 3,884,446 | 5/1975 | Erickson | 92/98 R X |
| 3,911,796 | 10/1975 | Hull et al. . | |
| 3,926,094 | 12/1975 | Kurichh et al. | 92/63 |
| 4,005,639 | 2/1977 | Welsh, Jr. . | |
| 4,043,251 | 8/1977 | Ohmi . | |
| 4,050,859 | 9/1977 | Vork . | |
| 4,086,036 | 4/1978 | Hagen et al. . | |
| 4,353,291 | 10/1982 | Hauduc . | |
| 4,391,184 | 7/1983 | Yamane et al. . | |

(List continued on next page.)

FOREIGN PATENT DOCUMENTS

| 925385 | 5/1973 | Canada . |
|---|---|---|
| 2088525 | 6/1982 | United Kingdom . |

*Primary Examiner*—John E. Ryznic
*Attorney, Agent, or Firm*—Howard & Howard

[57] ABSTRACT

A diaphragm for spring brake actuators includes an aperture that receives a threaded securement member such that the diaphragm is directly fixed to a push rod. In this way, misalignment between the push rod and the diaphragm is eliminated. To overcome any leakage through the aperture the diaphragm is formed with sealing beads compressed by the securement member to achieve a seal. Preferably, diaphragm plates are received on each side of the diaphragm, and the sealing beads are compressed by the securement member to achieve a seal between the securement member and the diaphragm plates. An adequate seal is thus achieved, while still allowing the direct connection of the diaphragm to the push rod by a threaded connecting member. The diaphragm plate on the power spring side of the diaphragm extends upwardly into a recess in the power spring plate, and is in facial contact in an axial direction with a surface of the power spring plate when the spring is actuated. At the same time, there is a clearance when the spring is compressed, such that misalignment of the push rod due to manufacturing tolerances is also eliminated. This contact resists misalignment between the power spring plate and the diaphragm plate, and consequently the diaphragm. There is some small radial clearance between the outer periphery of the diaphragm plate and the power spring plate such that the two members are "free floating" and may have some small amount of relative adjustment.

22 Claims, 1 Drawing Sheet

U.S. PATENT DOCUMENTS

| | | | |
|---|---|---|---|
| 4,505,188 | 3/1985 | Weydt et al. | 92/99 X |
| 4,640,135 | 2/1987 | Kastel et al. . | |
| 4,664,016 | 5/1987 | Tobisawa et al. . | |
| 4,666,378 | 5/1987 | Ogawa . | |
| 4,850,263 | 7/1989 | Rumsey et al. . | |
| 4,860,640 | 8/1989 | Ware | 92/63 |
| 4,936,758 | 6/1990 | Coble . | |
| 5,002,164 | 3/1991 | Bowyer . | |
| 5,105,727 | 4/1992 | Bowyer | 92/63 |

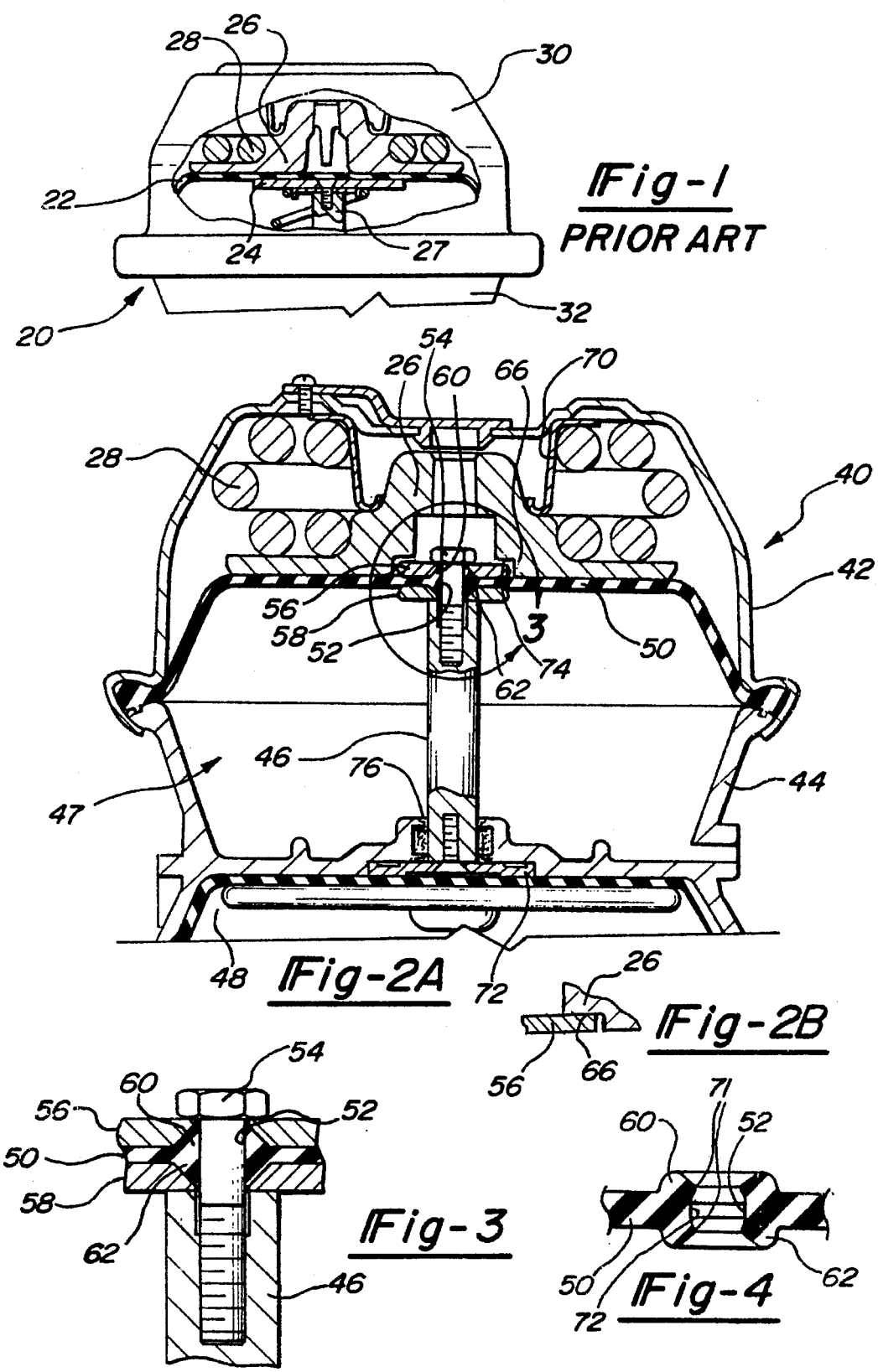

PERFORATE DIAPHRAGM ALIGNMENT SYSTEM FOR SPRING BRAKE ACTUATORS

This Application relates to an improvemere in diaphragms for spring brake actuators that maintains the push rod, diaphragm and power spring properly aligned relative to each other during operation of the spring brake actuator.

During operation of prior art spring brake actuators, there has been misalignment between the power spring, the push rod the diaphragm. Spring brake actuators are subject to vibration and power spring lateral force, which have been the cause of much of the misalignment.

The prior art has attempted to address the misalignment problem by providing positive engagement in a radial direction between the diaphragm and the power spring piston. Such attempts have not proven fully successful, as there has still been misalignment between the push rod and diaphragm and also with the power spring piston. Further, the positive radial engagement between the diaphragm and the power spring piston does not allow any relative movement or "floating." Some "floating," or small relative radial movement for adjustment is sometimes desirable provided such movement does not result in misalignment.

Other attempts to address the alignment problem include structures having openings through the diaphragm which receive complicated connections between the power spring piston and the push rod. These systems have not only been overly complex, but proper sealing of the diaphragm has not been achieved. The power spring chamber diaphragm must withstand a constant 100 psi environment. Any opening must be sealed against this high pressure. There can be no leakage through the diaphragm or the spring brake actuator will fail.

Further, with the universal acceptance of spring brake actuators having deformed housing members, it becomes more important that any structure within the spring chamber be capable of maintaining a reliable seal for a relatively long period of time.

For that reason the prior art attempts to prevent misalignment have been somewhat unsatisfactory.

SUMMARY OF THE INVENTION

The instant invention properly aligns the push rod and the diaphragm by forming an opening through the diaphragm, and bolting the diaphragm directly to the push rod. The opening through the diaphragm is preferably sealed by sealing beads on at least one side of the diaphragm, or more preferably both sides. The sealing beads are compressed by the bolt to achieve a seal at the opening through the diaphragm. In this way, the relatively secure connection between the push rod and diaphragm achieved by the opening through the diaphragm is provided. At the same time, the unique seal prevents leakage.

In another inventive aspect of this invention, metal diaphragm plates are placed on each side of the diaphragm, and the bolt extends through those metal plates to secure the diaphragm to the push rod. The diaphragm plate on the power spring side of the diaphragm has abutting facial contact with the power spring piston in an axial direction when the spring brake actuator is actuated. There is radial clearance between the outer periphery of the diaphragm plate and the power spring piston that provides some small freedom of adjustment between the diaphragm plate and the power spring piston. Thus, the lack of relative radial movement for adjustment as found in prior art alignment systems is avoided. At the same time, when the brake is actuated, the facial contact between the power spring piston and the diaphragm plate eliminates misalignment between the push rod, the diaphragm and the power spring piston.

In a preferred embodiment of this invention, sealing beads are formed on both sides of the diaphragm to provide the seal. In a further preferred embodiment, diaphragm plates are associated with each side of the diaphragm, and are compressed by the bolt against the diaphragm to compress the sealing beads. The sealing beads also improve the integrity of the connection between the diaphragm and the push rod by resisting any torque tending to loosen the bolt. Finally, the beads provide a thicker portion of the diaphragm that strengthens the diaphragm around the aperture and is thus more capable of withstanding fatigue and resisting tearing or other failure.

It is preferred that the inner diameter of the diaphragm plates have a frusto-conical shape that compresses the sealing beads on the diaphragm. This structure further improves the gripping between the sealing beads and the bolt, improving the seal and increasing torque resistance. Further, the diaphragm aperture preferably has a curved bore that grips the bolt, preventing leakage and improving torque resistance. In broader features of the invention, the compression of the diaphragm could be achieved by forming the bore to have a sufficiently small inner diameter that it seals on the bolt itself, without any sealing bead.

In another feature of this invention, the diaphragm plate on the power spring side of the diaphragm is spaced from the power spring piston in the axial direction when the spring brake actuator is in its "ready state" with the power spring compressed. The size of the various components is selected such that when the push rod is in its fully uppermost position (in the direction shown in FIG. 2) there is a clearance between the power spring diaphragm plate and the power spring piston. This clearance is selected to be relatively small such that the power spring diaphragm plate is still received within the recess in the power spring piston, and show that there is still the above-described facial contact when the spring brake actuator is actuated. At the same time, the clearance is selected to be sufficiently large such that if all of the brake components are at the outermost range of their tolerances, there would still not be contact between the diaphragm plate on the power spring side and the power spring piston in the axial direction, when the spring is compressed. If there were contact in this position, due to manufacturing tolerances, prior to the push rod being at its fully uppermost position, there would be the opportunity for misalignment to occur since the lower half of the push rod would not be properly positioned against the flange case, as is desirable. The clearance insures that the lower half of the push rod is in position flat against the flange case when the push rod is in its uppermost position with the power spring compressed.

These and other features of the present invention can be best understood from the following specification and drawings, of which the following is a brief description.

BRIEF DESCRIPTION OF THE DRAWINGS

FIG. 1 is a cross-sectional view of a prior art spring brake.

FIG. 2A is a cross-sectional view of a spring brake incorporating the present invention.

FIG. 2B is a cross-sectional view of a small portion of a spring brake incorporating the present invention, with the spring being actuated.

FIG. 3 is an enlarged view of the portion of FIG. 2 identified by the line 3.

FIG. 4 is a view of a portion of the diaphragm of this invention.

DETAILED DESCRIPTION OF PREFERRED EMBODIMENTS

As shown in FIG. 1, a prior art spring brake actuator 20 typically incorporates a diaphragm 22 positioned between a push rod plate 24 and a power spring plate 26. Push rod 27 is forced outwardly of the spring chamber by a power spring 28 to actuate the brake under certain conditions. The internal components are secured between a first housing 30, typically known as a "head," and a second housing 32, typically known as a "flange case." As the push rod 27, push rod plate 24, diaphragm 22, power spring plate 26 and power spring 28 reciprocate within the spring chamber, it is important that there be no relative misalignment between the members. As discussed above, the prior art has attempted to reduce misalignment, but these attempts have not proven commercially successful.

Applicant's invention addresses the misalignment problem by connecting the push rod to the diaphragm with a securement member extending through a hole in the diaphragm. As shown in FIG. 2A, a spring brake actuator 40 includes a head 42 permanently deformed in contact with a flange case 44. A push rod 46 moves within a chamber 47, outwardly of the flange case 44 and into a service chamber 48. As is known, when the push rod 46 moves downwardly from the position shown in this figure, it actuates a brake to stop a vehicle.

Diaphragm 50 is secured between head 42 and flange case 44, and includes a central aperture 52 through which securement member 54, which is preferably a bolt, extends. Bolt 54 is fixed to push rod 46. In this way, diaphragm 50 and push rod 46 are directly fixed for reciprocal movement, and any relative misalignment is eliminated. In the prior art, a return spring typically biases the diaphragm upwardly. However, with this invention the push rod is fixed to the diaphragm, and the return spring may be eliminated.

A first diaphragm plate 56 is secured on the spring side of diaphragm 50, and between diaphragm 50 and the head of bolt 54. A second diaphragm plate 58 is secured on the opposed side of diaphragm 50, and between the diaphragm 50 and the push rod 46.

A sealing bead 60 is formed on a top side of diaphragm 50, and a second sealing bead 62 is formed on the opposed side of diaphragm 50. Sealing beads 60 and 62 are deformed by the first and second diaphragm plates 56 and 58. In a relaxed position the sealing beads preferably have the profile shown in FIG. 4.

As shown in FIG. 3, the diaphragm plates 56 and 58 have central bores 59 with a frustro-conical inner diameter that deforms sealing beads 60 and 62 against bolt 54. When bolt 54 is tightened, sealing beads 60 and 62 are compressed axially and radially to provide a seal between the bolt 54, and the plates 56 and 58. In this way, the aperture 52 through diaphragm 50 is securely sealed. As will be explained with reference to FIG. 4, central aperture 52 is curved and grips bolt 54 securely. The biasing of the sealing beads against the bolt 54 provides increased torque resistance making it less likely that the bolt will begin to loosen during operation of spring brake actuator 40. In addition, the sealing beads 60 and 62 provide additional strength and support at the aperture 52 formed through the diaphragm. With a simple hole formed through the diaphragm, the diaphragm is more likely to rip or tear, causing the diaphragm to leak.

The above-described invention achieves the benefits of a direct connection between the diaphragm and the push rod, while at the same time providing an adequate seal on the required aperture. As such, the inventive combination provides unexpected beneficial results.

As shown in FIG. 2A, a recess 66 is formed in the power spring plate 26 to receive the diaphragm plate 56. There is a small radial clearance between the outer periphery of the diaphragm plate 56 and the inner periphery of the recess 66. That radial clearance is preferably between ¹⁄₃₂ and ½ of an inch and, most preferably on the order of ¹⁄₁₆ of an inch.

As also shown in FIG. 2A, the diaphragm plate 56 has a metal surface spaced out of abutting facial contact with an inner lace of recess 66 in an axial direction by a small gap 74. Power spring 28 and the force from air pressure in the spring chamber 47 both apply a strong force tending to hold diaphragm 50, against the power spring plate 26. The power spring plate 26 is thus held firmly against the power spring guide 70, holding the power spring 28 in place. This force resists relative radial movement between diaphragm plate 56 and power spring plate 26. At the same time, should relative radial movement or adjustment be required between power spring plate 26 and diaphragm plate 56, the small clearance will allow some small radial movement.

As shown in FIG. 2A, a plate 72 is bolted to push rod 46, and the push rod is shown in its uppermost position wherein plate 72 abuts the flange case 44. If the push rod 46 is allowed to move to the extent such that plate 72 abuts flange case 44, it can be assured that the push rod 46 will not be misaligned, but rather will extend in a true axial direction. In the past, there may have been insufficient room or the push rod 46 to travel upwardly. If the push rod is not able to move fully to the position where the plate 72 abuts the flange case 44, it is not held in a straight axial orientation. This result would primarily be caused due to manufacturing tolerances resulting in a build-up conditions such that there is insufficient travel room for push rod 46. To address the possibility of insufficient travel room, the clearance gap 74 is provided in an axial direction between the uppermost diaphragm plate 56 and the inner face of recess 66. Clearance gap 74 is selected to be relatively small. Thus, the diaphragm plate 56 is still received within the axial extent of the recess 66. At the same time, clearance gap 74 is selected such that the outermost limits of the tolerance build-up of the various components cannot result in there being contact between the diaphragm plate 56 and the end face of recess 66, before plate 72 bottoms out on flange case 44. With this inventive feature, one can always be assured that the push rod 46 will be extending in a true axial direction when the brake is in the compressed spring state, as shown in FIG. 2A. In some instances, the misaligned push rod has damaged the bearings 76, resulting in even more misalignment. Furthermore, with the diaphragm fixed to the pushrod and the diaphragm firmly pressing against the power spring piston, the push rod is prevented from wiggling (oscillating) from severe road checks (chuck holes). Oscillations of the push in the actuators has led to early bearing (76) failures.

When the spring 28 moves to its extended position to actuate the brake, the position of the diaphragm plate 56 and the power spring plate 26 is as shown in FIG. 2B. Diaphragm plate 56 is in abutting facial contact with the end of recess 66 in the power spring piston 26. The metal to metal contact in the axial direction between diaphragm plate 56 and power spring piston 26 insures that no major misalignment will occur, while the brake is in its actuated position.

The combination of the clearance gap 74 and the abutting facial contact in the actuated position as shown in FIG. 2B, insures that there will be no misalignment due to tolerance build-up, or while the brake is actuated. The relative flexibility of the diaphragm allows the diaphragm to flex a sufficient amount such that the power spring piston 26 can contact the diaphragm plate 56 when the brake is actuated, as shown FIG. 2B. At the same time, the clearance gap 74 is maintained when the push rod 46 is in its uppermost position due to the plate 72 providing a stop against the flange case 44 preventing further upward movement.

FIG. 4 is a cross-sectional view of the diaphragm 50 and sealing beads 60 and 62. The beads have a generally curved profile. The central aperture 52 has a curved inner diameter with end portions 71 of an inner diameter that is less than the inner diameter of a central portion 72. Preferably both ends 72 and central portion 72 have an inner diameter that is less than the outer diameter of the bolt 54 received through central aperture 52. The distance between the axial ends of beads 60 and 62 in their relaxed positions (FIG. 4) is substantially greater than in their compressed sealed position (FIG. 4). The distance when the beads are compressed is on the order of 50% of the relaxed distance.

As an alternative design, it may be unnecessary to compress the sealing bead on the diaphragm to achieve the seal. Rather, the inner diameter of central aperture 52 may be selected to be sufficiently small such that when compressed by bolt 54 it will be able to achieve an adequate seal on its own. Obviously in such an embodiment, the diaphragm plates 56 and 58 need not have the frustro-conical inner surfaces corresponding to the sealing beads 60 and 62.

The diaphragm plates are most preferably formed from a suitable steel. The diaphragm is preferably formed of standard diaphragm materials as used in spring brakes. While the sealing beads alone provide an adequate seal, in some applications it may be desirable to utilize Loctite™ or other sealant on the connection of the push rod to the diaphragm after the bolt is tightened.

A preferred embodiment of this invention has been disclosed, however, a worker of ordinary skill in the art would recognize that certain modifications would come within the scope of this invention. For that reason, the following claims should be studied in order to determine the true scope and content of this invention.

I claim:

1. A spring brake actuator comprising:
   a brake head housing defining a portion of a spring chamber;
   a flange case secured to said brake head to further define said spring chamber;
   a diaphragm secured between said brake head housing and said flange case;
   a power spring received between said diaphragm and said brake head housing;
   a push rod disposed in said spring chamber and on an opposed side of said diaphragm from said power spring, said push rod extending outwardly of said flange case, said diaphragm including a central aperture, a securement member extending through said central aperture and into said push rod, for securely connecting said diaphragm to said push rod; and
   said diaphragm being compressed against said securement member to provide a seal at said central aperture, wherein said central aperture has ends of an inner diameter that is less than the inner diameter of a central portion.

2. A spring brake actuator as recited in claim 1, wherein said diaphragm extends as a generally planar member at a central portion which includes said central aperture.

3. A spring brake actuator comprising:
   a brake head housing defining a portion of a spring chamber;
   a flange case secured to said brake head to further define said spring chamber;
   a diaphragm secured between said brake head housing and said flange case;
   a power spring received between said diaphragm and said brake head housing;
   a push rod extending outwardly of said flange case, said diaphragm including a central aperture, a securement member extending through said central aperture and into said push rod, for securely connecting said diaphragm to said push rod;
   said diaphragm being compressed by said securement member to provide a seal at said central aperture; and
   wherein there is a sealing bead extending outwardly of a planar portion on at least one side of said diaphragm, said sealing bead being compressed against said securement member.

4. A spring brake actuator as recited in claim 3, wherein a diaphragm plate is secured to said diaphragm by said securement means and compresses said sealing bead.

5. A spring brake actuator comprising:
   a brake head housing defining a portion of a spring chamber;
   a flange case secured to said brake head to further define said spring chamber;
   a diaphragm secured between said brake head housing and said flange case;
   a power spring received between said diaphragm and said brake head housing;
   a push rod extending outwardly of said flange case, said diaphragm including
   a central aperture, a securement member extending through said central aperture and into said push rod, for securely connecting said diaphragm to said push rod;
   said diaphragm being compressed by said securement member to provide a seal at said central aperture; and
   wherein there are sealing beads formed on both sides of said diaphragm, and both of said sealing beads are compressed by said securement member.

6. A spring brake actuator as recited in claim 1, wherein said securement member is a threaded member tightened into an opening in said push rod.

7. A spring brake actuator comprising:
   a brake head housing defining a portion of a spring chamber;
   a flange case secured to said brake head to further define said spring chamber;
   a diaphragm secured between said brake head housing and said flange case;
   a power spring received between said diaphragm and said brake head housing;
   a push rod extending outwardly of said flange case, said diaphragm including
   a central aperture securement member extending through said central aperture and into said push rod, for securely connecting said diaphragm to said push rod; and.
   said diaphragm being compressed by said securement member to provide a seal at said central aperture, a sealing bead formed on at least one side of said diaphragm which is compressed by said securement member;

a diaphragm plate secured to said diaphragm by said securement member and compressing said sealing bead; and wherein diaphragm plates are secured on both sides of said diaphragm, with one of said diaphragm plates being positioned between a portion of said securement member and said diaphragm, and the other of said diaphragm plates being positioned between said diaphragm and said push rod.

8. A spring brake actuator as recited in claim 7, wherein sealing beads extend axially from each side of said diaphragm, said securement member forcing said diaphragm plates to compress said sealing beads such that a seal is achieved between said securement member and said diaphragm plates.

9. A spring brake actuator as recited in claim 7, wherein said diaphragm plates have an inner bore that is frustro-conical, such that said frustro-conical bore compresses said sealing beads both axially and radially to achieve a seal at said central aperture.

10. A spring brake actuator as recited in claim 7, wherein a power spring plate is received between said diaphragm and said power spring, and said diaphragm plate on a side of said diaphragm spaced towards said power spring extends axially upwardly into a recess formed in said power spring plate, there being facial contact in an axial direction between said diaphragm plate and said power spring plate when said power spring is actuated, and there being radial clearance between an outer periphery of said diaphragm plate and power spring plate at said recess.

11. A spring brake actuator comprising:

a brake head housing defining a portion of a spring chamber;

a flange case secured to said brake head to further define said spring chamber;

a diaphragm secured between said brake head housing and said flange case;

a power spring received between said diaphragm and said brake head housing said diaphragm including a central aperture;

a power spring plate received between said power spring and said diaphragm, a recess formed in said power spring plate;

a push rod extending outwardly of said flange case;

a securement member extending through said central aperture in said diaphragm and into said push rod, said securement member securely connecting said diaphragm to said push rod;

a diaphragm plate secured on a side of said diaphragm spaced toward said power spring and extending upwardly into said recess in said power spring plate, there being facial contact between said diaphragm plate and said power spring plate at said recess when said power spring is actuated.

12. A spring brake actuator as recited in claim 11, wherein there is radial clearance between an outer peripheral surface of said diaphragm plate and said power spring plate.

13. A spring brake actuator as recited in claim 11, wherein said securement member is a threaded member.

14. A spring brake actuator as recited in claim 11, wherein there is an axial clearance in an axial direction between said diaphragm brake and said power spring when said power spring is compressed.

15. A spring brake actuator as recited in claim 14, wherein said axial clearance is selected such that it is sufficient for a plate fixed to a bottom end of said push rod to contact said flange case before said plate would contact said recess.

16. A spring brake actuator as recited in claim 15 wherein said diaphragm plate extending upward into said recess, even when said power spring is compressed, with said recess extending for a greater axial distance than said axial clearance between said diaphragm plate and said power spring plate at said axial clearance.

17. A spring brake actuator comprising:

a brake head housing defining a portion of a spring chamber;

a flange case secured to said brake head to further define said spring chamber;

a diaphragm secured between said brake head housing and said flange case;

a power spring received between said diaphragm and said brake head housing, said diaphragm including a central aperture;

a power spring plate received between said power spring and said diaphragm;

a push rod extending outwardly of said flange case;

a securement member extending through said central aperture and into said push rod, said securement member securely connecting said diaphragm to said push rod;

sealing beads formed on both sides of said diaphragm, and diaphragm plates secured to both sides of said diaphragm such that said diaphragm plates compress said sealing beads to provide a seal between said diaphragm plates and said securement member at said central aperture; and a recess formed in said power spring plate, said diaphragm plate on a side of said diaphragm spaced toward said power spring extending upwardly into said recess in said power spring plate, and there being facial contact between said diaphragm plate and said power spring plate at said recess when said power spring is actuated, and there being radial clearance between an outer peripheral surface of said diaphragm plate and said power spring plate.

18. A spring brake actuator as recited in claim 17, wherein there is a axial clearance in an axial direction between said diaphragm brake and said power spring when said power spring is compressed.

19. A spring brake actuator as recited in claim 18, wherein said axial clearance is selected such that it is sufficient for a plate fixed to a bottom end of said push rod to contact said flange case before said plate would contact said recess.

20. A spring brake actuator as recited in claim 19, wherein said diaphragm plate extending upward into said recess, even when said power spring is compressed, with said recess extending for a greater axial distance than said axial clearance between said diaphragm plate and said power spring plate at said axial clearance.

21. A spring brake actuator comprising:

a brake head housing defining a portion of a spring chamber;

a flange case secured to said brake head to further define said spring chamber;

a diaphragm secured between said brake head housing and said flange case;

a power spring received between said diaphragm and said brake head housing, a power spring piston between said diaphragm and said power spring, and guiding said power spring;

a push rod extending outwardly of said flange case, said diaphragm including a central aperture, a securement member extending through said central aperture and into said push rod for securely connecting said diaphragm to said push rod;

said diaphragm being compressed by said securement member to provide a seal at said central aperture;

a diaphragm plate secured to said diaphragm by said securement member, and on a side of said diaphragm spaced toward said power spring, said spring piston including a recess facing said diaphragm at a central location, and said diaphragm plate extending upwardly into said recess and being in facial contact with said power spring piston at said recess.

22. A spring brake actuator as recited in claim 21, wherein there are diaphragm plates secured to both sides of said diaphragm.

* * * * *